United States Patent
Paschke (10) Patent No.: US 6,558,250 B1
(45) Date of Patent: May 6, 2003

(54) FABRIC FLOW RESTRICTION AND METHOD FOR RESTRICTING A FABRIC DUCT

(76) Inventor: Nicolas B. Paschke, 1129 N. Jackson St., Apt. 405C, Milwaukee, WI (US) 53202

( * ) Notice: Subject to any disclaimer, the term of this patent is extended or adjusted under 35 U.S.C. 154(b) by 0 days.

(21) Appl. No.: 09/694,715

(22) Filed: Oct. 23, 2000

(51) Int. Cl.$^7$ .............................................. F24F 13/06
(52) U.S. Cl. ..................................... 454/306; 454/903
(58) Field of Search ................. 454/306, 903; 138/40, 46

(56) References Cited

U.S. PATENT DOCUMENTS

| | | | |
|---|---|---|---|
| 2,406,272 A | 8/1946 | Van Vorhees | 160/281 |
| 2,423,241 A | 7/1947 | Kurth et al. | 454/306 |
| 2,595,408 A * | 5/1952 | Quest | 138/128 |
| 2,853,154 A | 9/1958 | Rivers | 55/341.1 |
| 2,857,108 A * | 10/1958 | Wallace | 237/53 |
| 3,151,962 A | 10/1964 | O'Deall | 55/350 |
| 3,195,296 A | 7/1965 | Janson | 55/298 |
| 3,204,391 A | 9/1965 | Schwab | 55/374 |
| 3,204,392 A | 9/1965 | Schwab | 55/381 |
| 3,357,088 A | 12/1967 | Hoffman | 454/306 X |
| 3,396,517 A | 8/1968 | Schwab | 553/68 |
| 3,538,686 A | 11/1970 | Schwab | 55/377 |
| 4,676,954 A | 6/1987 | Wilson | 422/124 |
| 4,875,912 A | 10/1989 | Fulmer | 55/279 |
| 5,111,739 A | 5/1992 | Hall | 454/306 |
| 5,117,893 A | 6/1992 | Morrison | 160/291 |
| 5,123,595 A | 6/1992 | Doss | 237/46 |
| 5,167,577 A | 12/1992 | Kristensson | 454/298 |
| 5,346,426 A * | 9/1994 | Kronfalt | 454/239 |
| 5,422,078 A | 6/1995 | Colon | 422/123 |
| 5,490,813 A | 2/1996 | Danielsen | 454/306 |
| 5,547,636 A | 8/1996 | Vick | 422/124 |
| 5,618,324 A | 4/1997 | Sommer | 55/497 |
| 5,655,963 A | 8/1997 | Paschke | 454/297 |
| 5,690,720 A | 11/1997 | Spero | 96/26 |
| 5,769,708 A | 6/1998 | Paschke | 454/306 |
| 5,924,597 A | 7/1999 | Lynn | 222/1 |
| 5,961,044 A | 10/1999 | Dalbec | 239/77 |
| 6,117,005 A * | 9/2000 | Weiss | 454/202 |
| 6,261,174 B1 * | 7/2001 | Kuehn | 454/306 X |
| 6,280,320 B1 | 8/2001 | Paschke et al. | 454/298 |

FOREIGN PATENT DOCUMENTS

| | | | |
|---|---|---|---|
| DE | 2 227 630 | * 12/1973 | 454/306 |
| EP | 0175892 | 4/1986 | F24F/13/02 |
| EP | 0840072 | 5/1998 | F24F/13/06 |
| EP | 0899519 | 3/1999 | F24F/13/068 |
| FR | 2713317 | 6/1995 | F24F/7/05 |
| JP | 63-003143 | 1/1988 | F24F/13/02 |
| JP | 03-110342 | 5/1991 | F24F/13/02 |

OTHER PUBLICATIONS

"Installation Instructions Models PFT–XD & PFT–XHD Air Control Duct," Berner International Corporation, May, 1996, 3 pages.

"Q–Duct Installation Instructions," Q–Duct Incorporated, Jun. 1999, 7 pages.

* cited by examiner

*Primary Examiner*—Harold Joyce
(74) *Attorney, Agent, or Firm*—Marshall, Gerstein & Borun (57) ABSTRACT

A fabric flow restriction and method for adjusting the flow resistance through a fabric duct enables balancing the airflow through a network of fabric ducts. The fabric ducts are air permeable and/or include discharge openings that evenly disperse supply air from within the duct to a room being heated, cooled, ventilated, or otherwise conditioned by the air. Disclosed embodiments include flow restrictions that are adjustable by tightening a drawstring that constricts an annular web disposed within the duct or constricts the fabric duct itself, selectively masking portions of a fabric mesh installed inside the duct, or by interchanging fabric meshes of various flow resistance. In any case, the flow restriction consists of flexible fabric that tends to conform to the changing shape of a fabric duct as the duct alternately inflates and deflates due to changes in air pressure within the duct.

23 Claims, 5 Drawing Sheets

FABRIC FLOW RESTRICTION AND METHOD FOR RESTRICTING A FABRIC DUCT

BACKGROUND OF THE INVENTION

1. Field of the Invention

The subject invention generally pertains to fabric air ducts and more specifically to a damper for such a duct.

2. Description of Related Art

In HVAC systems (heating, ventilating, air conditioning), conditioned supply air discharged from a blower is often conveyed to various rooms or areas within a building by way of ductwork. Conventional sheet metal ductwork may include a main header duct that receives the forced air from the blower and distributes the air onto several branch ducts. The branch ducts, in turn, include one or more discharge registers that deliver the air to the various designated areas.

To ensure that each branch duct receives an appropriate volume of air to adequately condition or ventilate each room or area, airflow control dampers are often installed within the branch ducts, upstream of the ducts' discharge registers. Partially closing a damper prevents its respective branch duct from starving other branch ducts of their supply of air. The various dampers are adjusted until the supply air to each of the branches is properly apportioned, which is a process known as balancing the airflow.

In addition to dampers disposed within the ducts, in some cases, additional dampers are installed at each discharge register. The dampers at the discharge registers allow more individualized control of airflow through each register or allow a register to be shut off completely. The occupants of the building typically adjust the individual dampers at each register, while the other dampers within the ducts are thermostatically controlled or manually adjusted and set when the HVAC system is first installed.

Balancing the airflow is readily accomplished when the ductwork, dampers and registers are all made of relatively rigid sheet metal, however, in many cases, air ducts are made of fabric. Fabric ducts typically have a flexible fabric wall that is porous and/or includes additional holes along its length for evenly dispersing air, from within the duct, to the areas being conditioned or ventilated. An example of such a duct is a DUCTSOX by the Frommelt Safety Products Corporation of Milwaukee, Wis. Fabric ducts are often suspended from a horizontal cable or track by way of several hangers distributed along the length of the duct. Fabric is often preferred over sheet metal when cleanliness, even air dispersion, condensation control, or appearance is a significant concern. Unfortunately, using conventional metal dampers within fabric ducts creates some problems.

First, the pliability of fabric may inhibit the duct from effectively supporting the weight of a metal damper without excessive distortion or sagging of the duct. Second, the supply air blower turning on and off to meet the conditioning demand of the building causes a fabric duct to alternately inflate and deflate. When the duct is deflated, a metal damper may create an unsightly bulge in the duct.

SUMMARY OF THE INVENTION

In order to restrict airflow from an upstream fabric duct to a downstream fabric air duct, an air duct assembly disclosed herein includes a fabric flow restriction disposed between the two fabric ducts, wherein the flow restriction can be manipulated to facilitate balancing the airflow through the ducts.

In some embodiments, the flow restriction is manipulated by replacing one flow restriction with another of a different flow resistance.

In some embodiments, the flow restriction is removably installed by virtue of a zipper or a touch-and-hold fastener.

In some embodiments, the flow resistance of the flow restriction is adjusted by varying the constriction of a cinch.

In some embodiments, the flow restriction comprises a fabric mesh.

In some embodiments, the flow resistance of a flow restriction is adjusted by varying the relative angular orientation of two overlaying fabric meshes.

In some embodiments, the flow resistance of a flow restriction is adjusted by varying the size of patch that masks a fabric mesh.

DESCRIPTION OF THE PREFERRED EMBODIMENT

Figures 1, 2, 3:
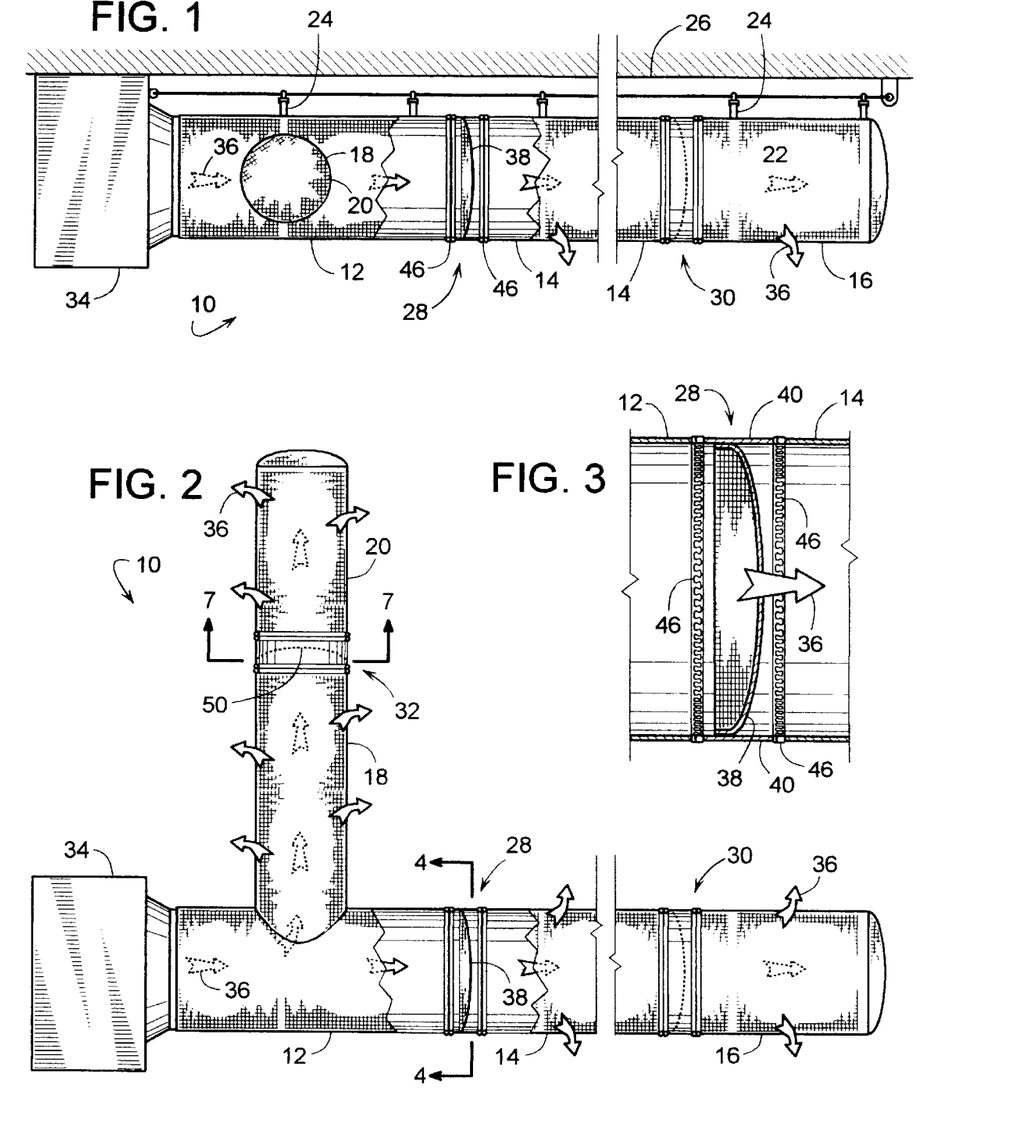
FIG. 1 is a front view with a partial cut-away showing a fabric air duct assembly that includes fabric flow restrictions.
FIG. 2 is a bottom view of FIG. 1.
FIG. 3 is a closer view of the cut-away portion of FIG. 1.

An air duct assembly 10, shown in FIGS. 1 and 2, includes several fabric ducts 12, 14, 16, 18 and 20 that are suspended within a building 22 by series of connectors 24, which hang from one or more elongated support members 26, such as a track or a taut cable. Several fabric flow restrictions 28, 30, and 32 help balance the volume of airflow through the ducts. An air handler 34, such as a fan or blower disposed within an enclosure, forces air 36 into a main duct 12. In this example, duct 12 consists of fabric; however, it could also be made of sheet metal or of another material. The term, "fabric," refers to any pliable sheet of material that may or may not be air permeable or porous. Examples of a fabric include, but are not limited to, woven or knit cloth, flexible plastic sheeting that is not necessarily woven, plastic impregnated cloth, fiber reinforced plastic, and various combinations thereof.

Main duct 12 feeds air 36 into two branch ducts 14 and 18, which in turn feed air 36 into two other branch ducts 16 and 20 respectively. Thus, ducts 14 and 16 are in series-flow relationship to each other, and so are ducts 18 and 20. Duct 14 is in parallel-flow relationship with ducts 18 and 20 and so is duct 16. The term, "parallel-flow" refers to airflow being split between two different paths. Forced air 36 from air handler 34 or another source inflates each of the fabric ducts to a tubular shape, as shown. Porosity and/or other openings in the ducts' fabric allow the air within ducts 14, 16, 18 and 20 to disperse into a room or area that is being ventilated or otherwise conditioned by air 36. In some cases, main duct 12 may be air-permeable to disperse some air into part of the building as well.

Flow restrictions 28, 30 and 32 each have a flow resistance that has been individually set to apportion the airflow being discharged through the fabric wall of each of ducts 14, 16, 18 and 20. The term, "flow resistance" is a measure of a restriction's ability to create a pressure drop for a given volume of airflow through the restriction. Thus, for a given volume of airflow, a higher pressure drop is created by a restriction having a higher flow resistance. Likewise, for a given pressure drop across a restriction, a lower volume of airflow is conveyed through a restriction having a higher flow resistance. The flow resistance of a flow restriction can be set or adjusted by a variety of methods, depending on the structural design of the restriction.

Figure 4:
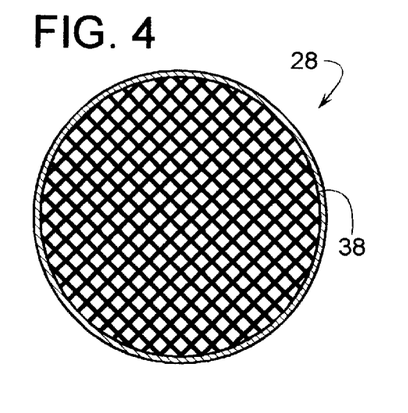
FIG. 4 is a cross-sectional view taken along line 4—4 of FIG. 2.
Figure 5:
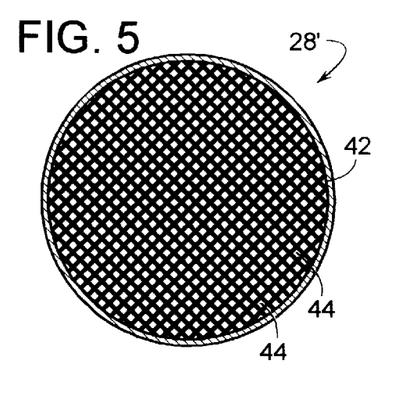
FIG. 5 is similar to FIG. 4 but of another flow restriction.

For restriction 28, for example, flow resistance is created by an air-permeable fabric mesh 38 whose periphery is sewn or otherwise attached to a fabric sleeve 40, as shown in FIG. 3. To provide relatively low flow resistance, mesh 38 can be relatively course, as shown in FIG. 4. To provide greater flow resistance, an alternate, finer mesh 42 with more openings 44 per square-inch can be used, as shown in FIG. 5. Greater flow resistance can also be provided by a mesh having the same quantity or even less openings than mesh 38, but with openings that are smaller than those of mesh 38.

Figure 6:
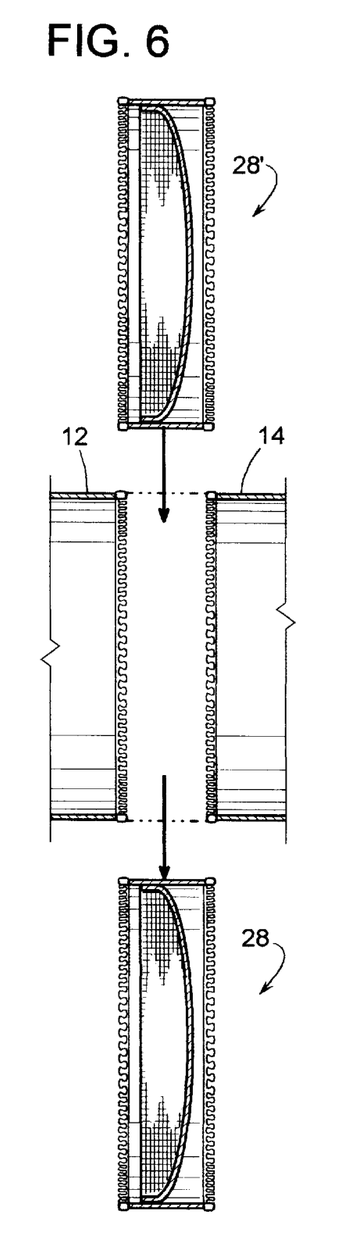
FIG. 6 illustrates manipulating a fabric flow restriction to vary the volume of airflow therethrough.

To manipulate or adjust the flow resistance, sleeve 40 is provided with a releasable fastener 46 at each end to releasably attach to ducts 12 and 14. This allows restriction 28 to be readily replaced by another restriction 28' having a more desirable flow resistance, as shown in FIG. 6. Fastener 46 has been schematically illustrated to encompass a variety of releasable fasteners including, but not limited to, a zipper; a touch-and-hold fastener, such as VELCRO; and snaps.

Figure 7:
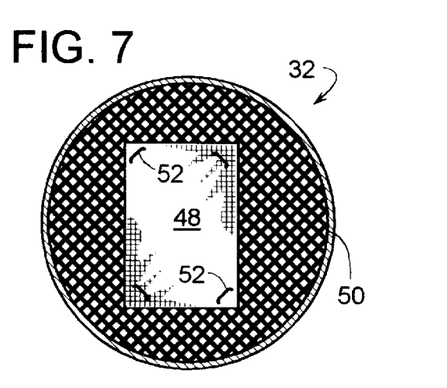
FIG. 7 is a cross-sectional view taken along line 7—7 of FIG. 2.

Flow resistance can also be adjusted by varying the size of a patch 48 that overlays a fabric mesh 50 of a flow restriction, such as restriction 32, as shown in FIG. 7. Here, patch 48 is of a fabric that is less air-permeable than mesh 50, which thus further restricts airflow. Patch 48 can be attached to mesh 50 by a variety of fasteners including, but not limited to, safety pins 52, snaps, touch-and-hold fasteners, adhesive, etc. Cutting or folding of patch 48 can be used to adjust its size or effective area.

Figure 8:
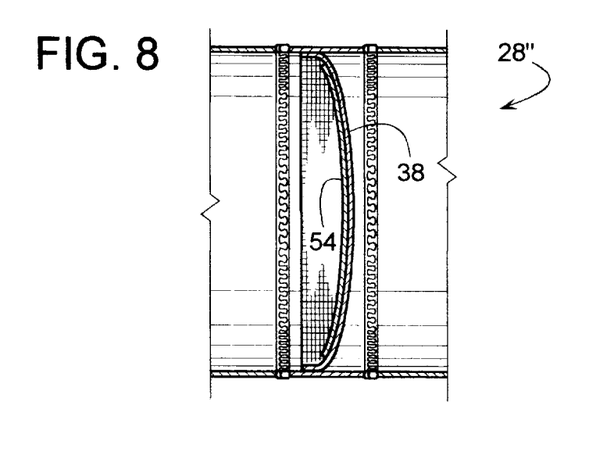
FIG. 8 is similar to FIG. 3, but with another mesh added to the flow restriction.
Figure 9:
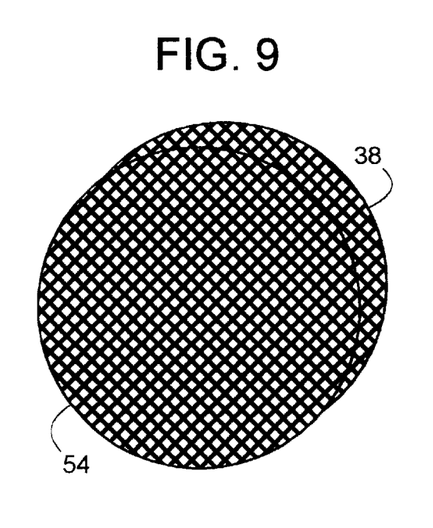
FIG. 9 shows one configuration of how the two meshes shown in FIG. 8 can overlaid.
Figure 10:
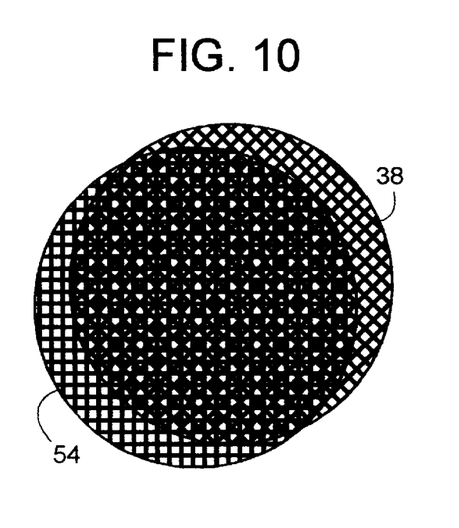
FIG. 10 shows another configuration of how the two meshes shown in FIG. 8 can overlaid.

In another embodiment, shown in FIGS. 8, 9 and 10, adjustable flow resistance is provided by overlaying a second fabric mesh 54 over mesh 38 to create a flow restriction 28". Placing the two meshes 38 and 54 in rotational registry, as shown in FIG. 9, aligns the respective openings of meshes 38 and 54 to provide restriction 28" with one level of flow resistance. Rotating mesh 38 relative to mesh 54, as shown in to FIG. 10, then provides restriction 28" with more flow resistance. Although, meshes 38 and 54 may be concentrically aligned to each other, FIGS. 9 and 10 show them slightly offset to more clearly illustrate the rotational orientation of each mesh 38 and 54.

Figure 11:
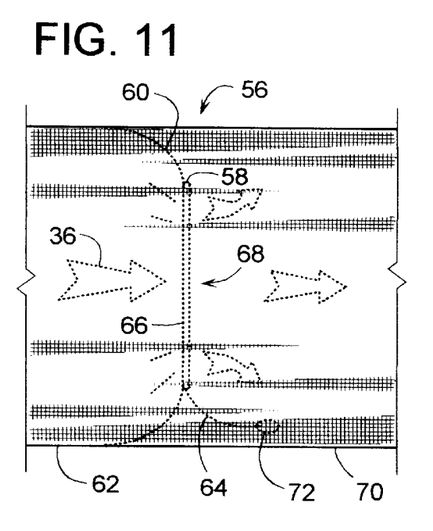
FIG. 11 is a side view of a fabric flow restriction disposed inside and situated between an upstream fabric duct and a downstream fabric duct.
Figure 12:
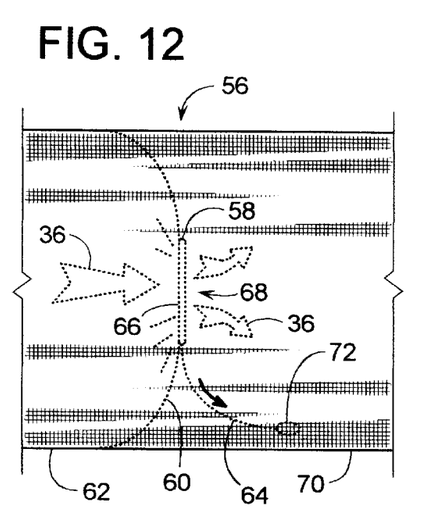
FIG. 12 is similar to FIG. 11, but with the flow restriction providing greater flow resistance.

For another flow restriction 56, shown in FIGS. 11 and 12, adjustable flow resistance is provided by varying the tightness of a cinch 58. Here, restriction 56 includes an annular fabric web 60 whose perimeter is sewn or otherwise attached to a fabric duct 62. A constrictable elongated member 64, such as a string, cable, strap, etc., feeds through a sleeve 66 that lines a central opening 68 of web 60. Drawing member 64 tighter constricts opening 68, which increases the flow resistance of restriction 56, and thus reduces the airflow to a downstream fabric duct 70, as shown in FIG. 12. Loosening member 64, as shown in FIG. 11, widens opening 68 to provide less flow resistance. Once achieving a desired flow resistance, member 64 can be held in place by some type of conventional fastener or even by a simple knot. Access to member 64 can be provided by a closable access opening through duct 62 or 70, or a pull-ring 72 can be provided on the exterior of the ducts by feeding member 64 through a small hole in duct 70. The fabric of web 60 can be porous or impermeable to air, depending the desired range of flow restriction.

Figure 13:
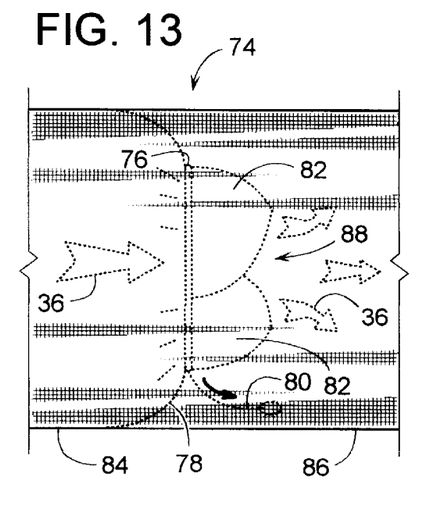
FIG. 13 is a side view of another fabric flow restriction disposed inside and situated between an upstream fabric duct and a downstream fabric duct.
Figure 14:
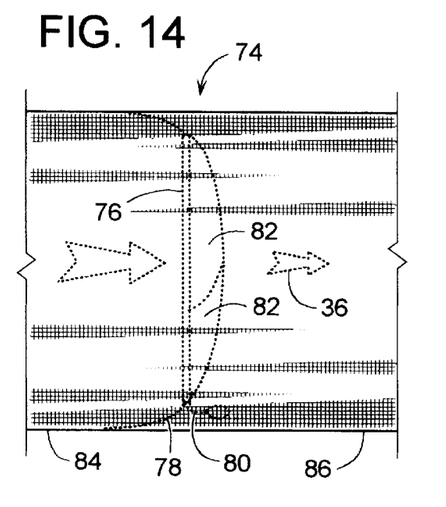
FIG. 14 is similar to FIG. 13, but with the flow restriction providing greater flow resistance.

In another flow restriction 74, similar to restriction 56 and shown in FIGS. 13 and 14, adjustable flow resistance is provided by varying the tightness of a cinch 76 about an inner diameter of an annular fabric web 78; however, flow resistance decreases with the tightness of cinch 76. When a constrictable elongated member 80 of cinch 76 is loose, as shown in FIG. 14, overlapping fabric flaps 82 extending from web 78 tend to close upon themselves to resist airflow from an upstream fabric duct 84 to a downstream fabric duct 86. Upon tightening member 80, as shown in FIG. 13, flaps 82 tend to pucker, which creates a central opening 88 in restriction 74 that reduces flow resistance. Flow restriction 74 can be created by adapting the structure disclosed in U.S. Pat. No. 5,655,963, which is specifically incorporated by reference herein.

Figure 15:
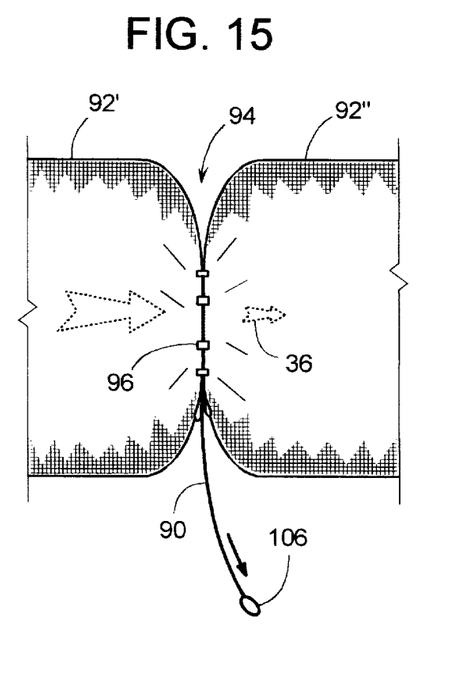
FIG. 15 is a side view of another fabric flow restriction interposed between an upstream fabric duct and a downstream fabric duct.
Figure 16:
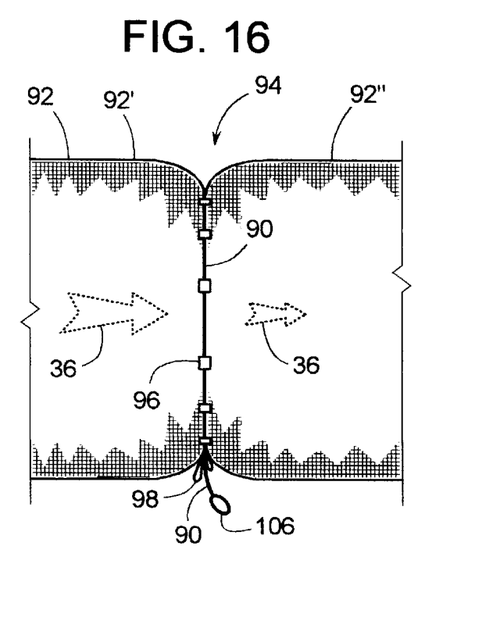
FIG. 16 is similar to FIG. 15, but with the flow restriction providing less flow resistance.

Adjustable flow resistance can also be provided by simply wrapping a constrictable member 90 about the exterior of a continuous fabric duct 92, thereby creating an upstream duct 92' and a downstream duct 92" with a fabric flow restriction 94 between the two, as shown in FIGS. 15 and 16. Tightening member 90 chokes off air 36 flowing from duct 92' to duct 92", as shown in FIG. 15. Loosening member 90, as shown in FIG. 16, reduces the air resistance. Threading member 90 through loops 96 attached to ducts 92' and 92" can help keep member 90 in position. A knot 98 or some other type of fastener can be used to hold member 90 at its proper constriction.

Figure 17:
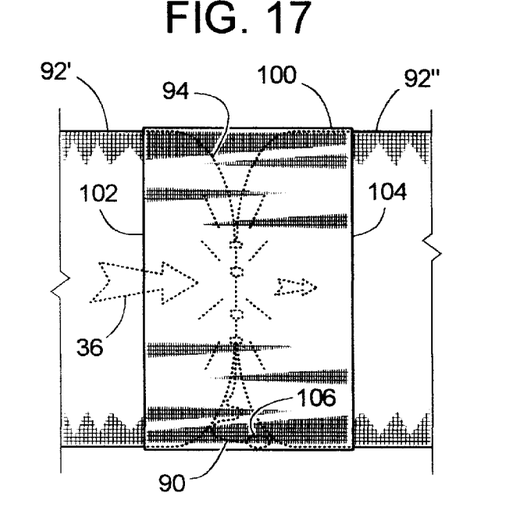
FIG. 17 is similar to FIG. 15, but with a fabric shroud covering the flow restriction.

To improve the appearance of ducts 92' and 92", a tubular fabric shroud 100 can be added to cover flow restriction 94. Shroud 100 can be attached to ducts 92' and/or 92" by a conventional fastener, examples of which include, but are not limited to, a zipper, touch-and-hold fastener, clips, snaps, buttons, adhesive, and a sewn seam. Access to member 90 can be provided by having at least one end 102 or 104 of shroud 100 removably attached or unattached to duct 92' or 92". Access to member 90 can also be provided by moving a pull-ring 106 to the exterior of shroud 100 by feeding member 90 through a small hole in shroud 100 or by feeding it through a small gap between shroud 100 and duct 92' or 92".

Although the invention is described with reference to a preferred embodiment, it should be appreciated by those skilled in the art that various modifications are well within the scope of the invention. Therefore, the scope of the invention is to be determined by reference to the claims that follow.

I claim:

1. An air duct assembly, comprising:

a first duct consisting of fabric;

a second duct consisting of fabric; and a fabric flow restriction having an adjustable flow resistance and being interposed between the first duct and the second duct, wherein the fabric flow restriction includes an outer tubular wall consisting of fabric and having an inlet connected to the first duct and an outlet connected to the second duct.

2. The air duct assembly of claim 1, further comprising a zipper that connects the fabric flow restriction to at least one of the first duct and the second duct.

3. The air duct assembly of claim 1, further comprising a touch-and-hold fastner that connects the fabric flow restriction to at least one of the first duct and the second duct.

4. The air duct assembly of claim 1, wherein the adjustable flow resistance is adjustable by virtue of a constrictable elongated member.

5. The air duct assembly of claim 1, wherein the fabric flow restriction includes a first fabric mesh.

6. The air duct assembly of claim 5, wherein the fabric flow restriction includes a second fabric mesh overlaying the first fabric mesh, wherein a rotational orientation of the first fabric mesh relative to the second fabric mesh sets the adjustable flow resistance.

7. The air duct assembly of claim 5, further comprising a patch overlaying the first fabric mesh, wherein the first fabric mesh is more air-permeable than the patch.

8. The air duct assembly of claim 1, wherein the fabric of the first duct is porous.

9. An air duct assembly, comprising:

a main duct;

a first branch duct consisting of flexible fabric and being in fluid communication with the main duct;

a second branch duct consisting of flexible fabric and being in fluid communication the main duct;

a first fabric flow restriction having a first flow resistance and being disposed within the first branch duct; and a second fabric flow restriction having a second flow resistance and being disposed within the second branch duct, wherein the first flow resistance is greater than the second flow resistance.

10. The air duct assembly of claim 9, wherein the first branch duct and the second branch duct are in parallel-flow relationship with each other.

11. The air duct assembly of claim 9, wherein the first branch duct and the second branch duct are in series-flow relationship with each other.

12. The air duct assembly of claim 9, wherein the main duct consists of a fabric.

13. The air duct assembly of claim 9, wherein the flexible fabric of the first branch duct and the second branch duct is porous.

14. The air duct assembly of claim 9, further comprising a zipper that connects at least one of the first fabric flow restriction and the second fabric flow restriction to at least one of the first branch duct and the second branch duct.

15. The air duct assembly of claim 9, further comprising a touch-and-hold fastener that connects at least one of the first fabric flow restriction and the second fabric flow restriction to at least one of the first branch duct and the second branch duct.

16. The air duct assembly of claim 9, wherein at least one of the first flow resistance and the second flow resistance is adjustable by virtue of a constrictable elongated member.

17. The air duct assembly of claim 9, wherein at least one of the first fabric flow restriction and the second fabric flow restriction includes a fabric mesh.

18. The air duct assembly of claim 9, wherein the first fabric flow restriction includes a first fabric mesh having a first number of openings per square-inch, and the second fabric flow restriction includes a second fabric mesh having a fewer number of openings per square-inch.

19. The air duct assembly of claim 9, wherein the first fabric flow restriction includes a first fabric mesh having a first number of openings per square-inch, and the second fabric flow restriction includes a second fabric mesh having a greater number of openings per square-inch.

20. A method of conveying a volume of air, comprising:

conveying the air through a first fabric duct;

conveying the air through a fabric flow restriction that is upstream of the first fabric duct; and manipulating the fabric flow restriction to vary the volume of air through the first fabric duct.

21. The method of claim 20, further comprising conveying the air through a second fabric duct, wherein the second fabric duct is upstream of the fabric flow restriction.

22. The method of claim 21, wherein both the first fabric duct and the second fabric duct are air-permeable.

23. The method of claim 20, wherein manipulating the fabric flow restriction involves replacing the fabric flow restriction with another fabric flow restriction.

* * * * *

UNITED STATES PATENT AND TRADEMARK OFFICE
Certificate

Patent No. 6,558,250 B1                                              Patented: May 6, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Nicholas B. Paschke, Milwaukee, WI; and Kevin J. Gebke, Dubuque, IA.

Signed and Sealed this Third Day of August 2004.

IRA S. LAZARUS
*Supervisory Patent Examiner*
*Art Unit 3749*

UNITED STATES PATENT AND TRADEMARK OFFICE
CERTIFICATE OF CORRECTION

PATENT NO. : 6,558,250 B1  
APPLICATION NO. : 09/694715  
DATED : May 6, 2003  
INVENTOR(S) : Nicolas B. Paschke Page 1 of 1

It is certified that error appears in the above-identified patent and that said Letters Patent is hereby corrected as shown below:

Col. 1, lines 39-40: Please delete "relatively rigid sheet metal," and insert --relatively rigid sheet metal;--.

Col. 3, line 42: Please delete "course" and insert --coarse--.

Col. 4, line 5: Please delete "as shown in to Fig. 10," and insert --as shown in Fig. 10--.

Col. 4, line 27: Please delete "depending the desired range" and insert --depending on the desired range--.

Col. 5, line 9: Please delete "consisting of" and insert --comprising--.

Col. 5, line 10: Please delete "consisting of" and insert --comprising--.

Col. 5, line 14: Please delete "consisting of" and insert --comprising--.

Col. 5, line 41: Please delete "consisting of" and insert --comprising--.

Col. 5, line 43: Please delete "consisting of" and insert --comprising--.

Col. 5, line 44: Please delete "communication the main duct," and insert --communication with the main duct--.

Signed and Sealed this

Twentieth Day of January, 2009

JON W. DUDAS  
*Director of the United States Patent and Trademark Office*